W. G. REYNOLDS.
TYPE MAKING MACHINE.
APPLICATION FILED MAY 2, 1908.

923,998.

Patented June 8, 1909.
8 SHEETS—SHEET 1.

Witnesses
C. E. Smith
Geo. E. Tew

Inventor
Wm. G. Reynolds
By
Attorneys

W. G. REYNOLDS.
TYPE MAKING MACHINE.
APPLICATION FILED MAY 2, 1908.

923,998.

Patented June 8, 1909.
8 SHEETS—SHEET 2.

W. G. REYNOLDS.
TYPE MAKING MACHINE.
APPLICATION FILED MAY 2, 1908.
923,998.
Patented June 8, 1909.
8 SHEETS—SHEET 3.
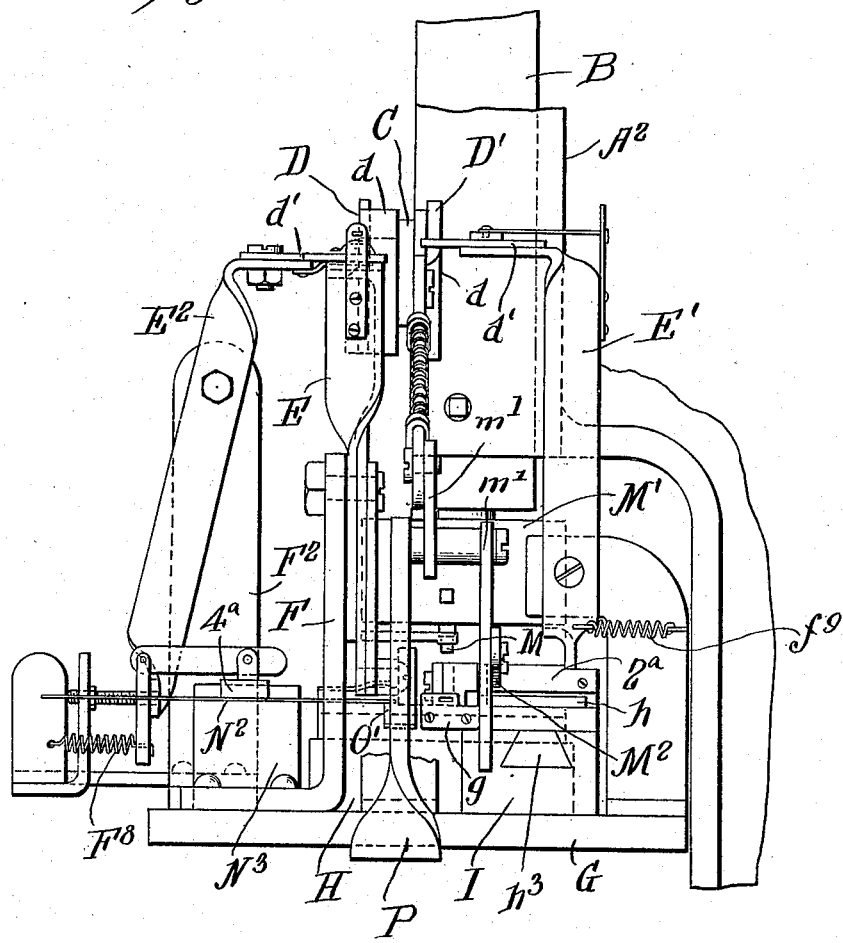

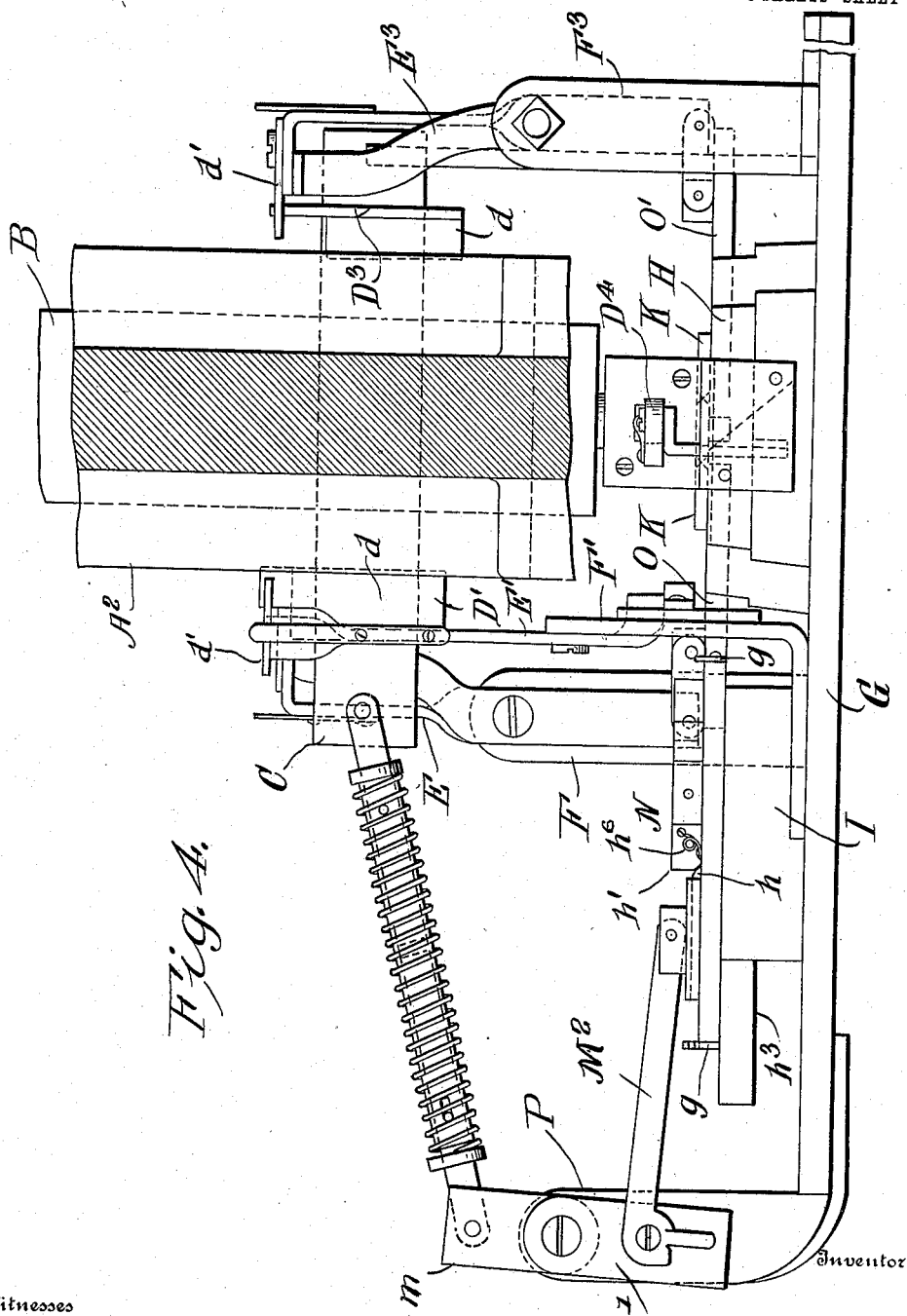

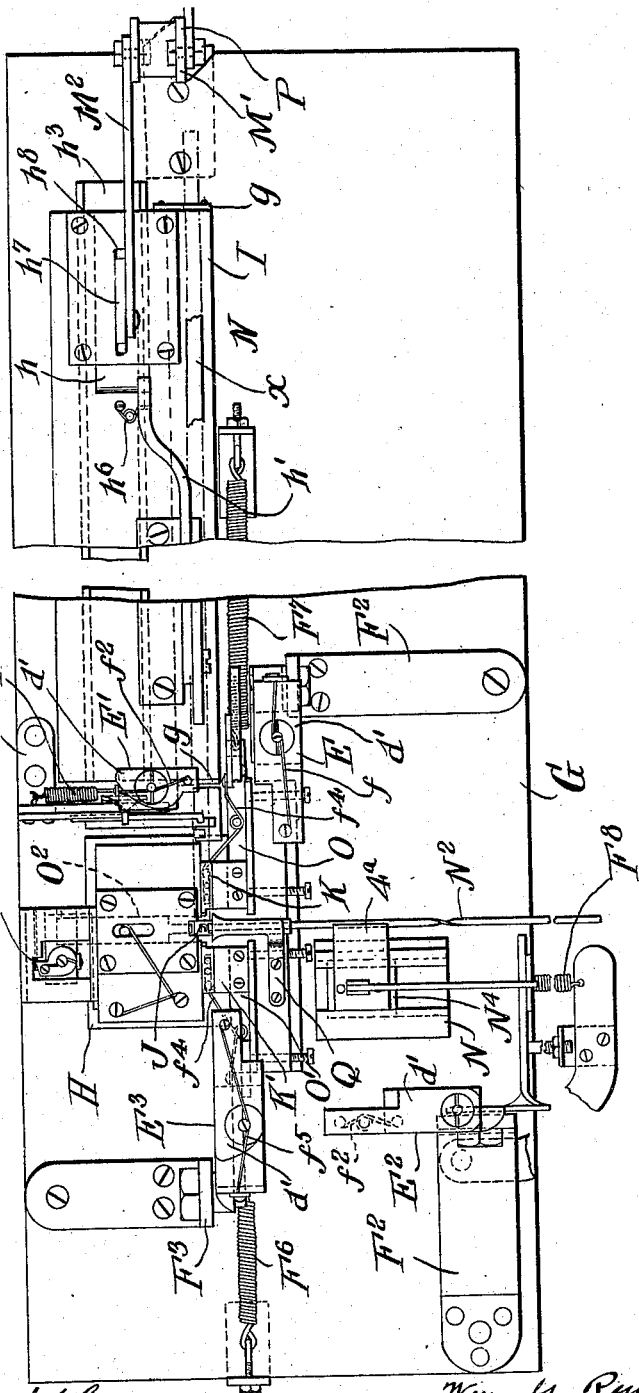

W. G. REYNOLDS.
TYPE MAKING MACHINE.
APPLICATION FILED MAY 2, 1908.
923,998.
Patented June 8, 1909.
8 SHEETS—SHEET 6.
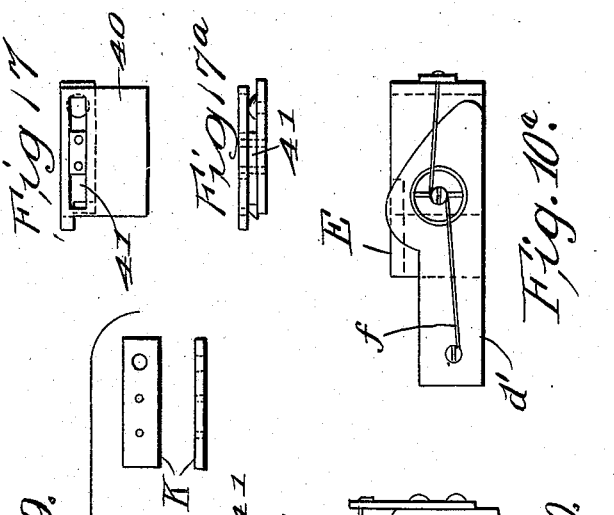
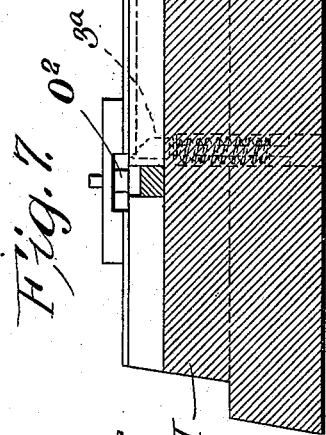
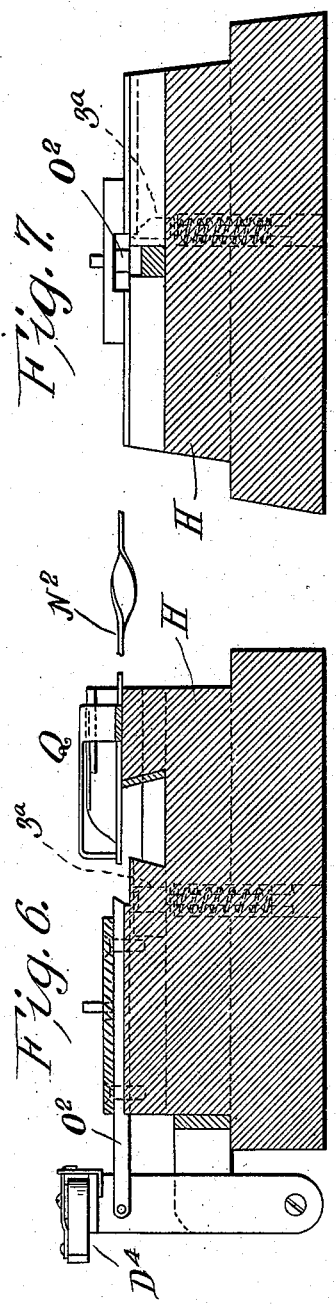
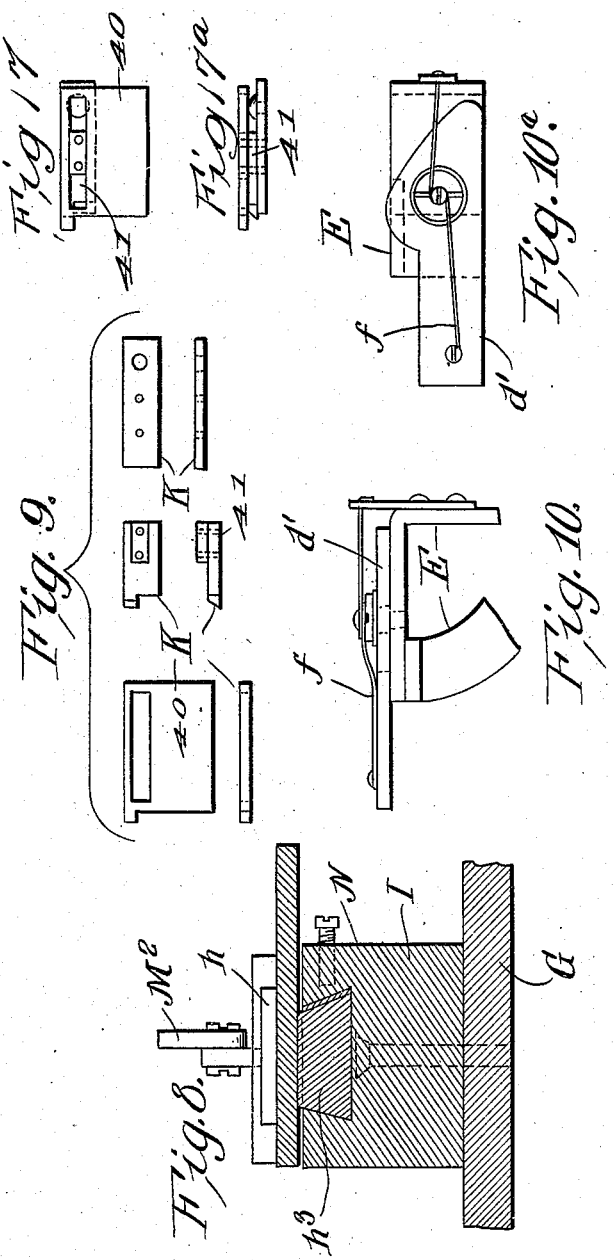
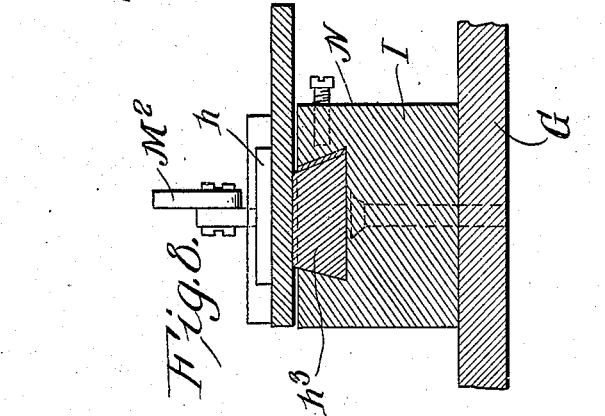

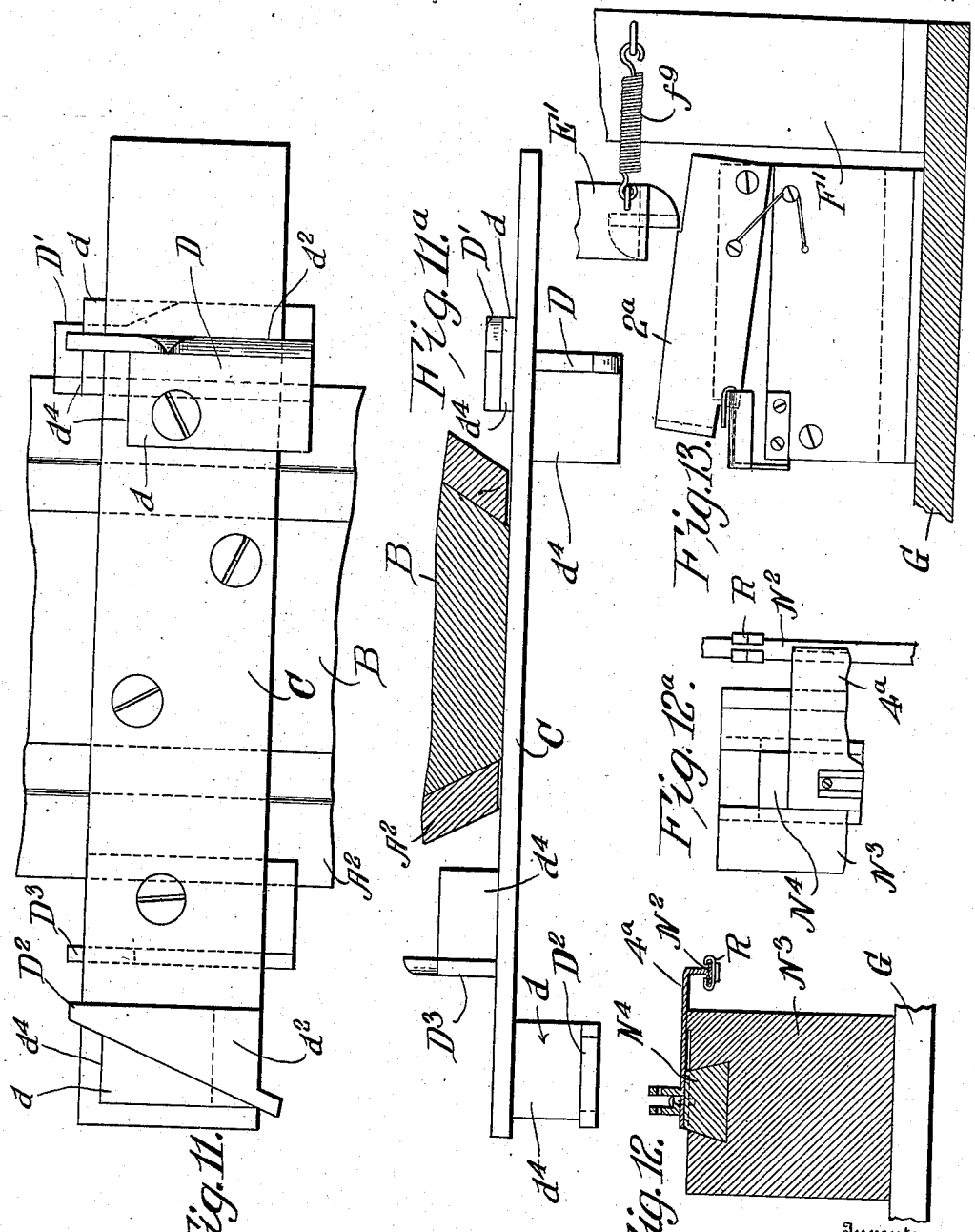

W. G. REYNOLDS.
TYPE MAKING MACHINE.
APPLICATION FILED MAY 2, 1908.
923,998.
Patented June 8, 1909.
8 SHEETS—SHEET 8.
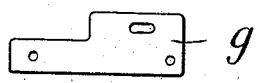
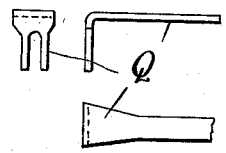
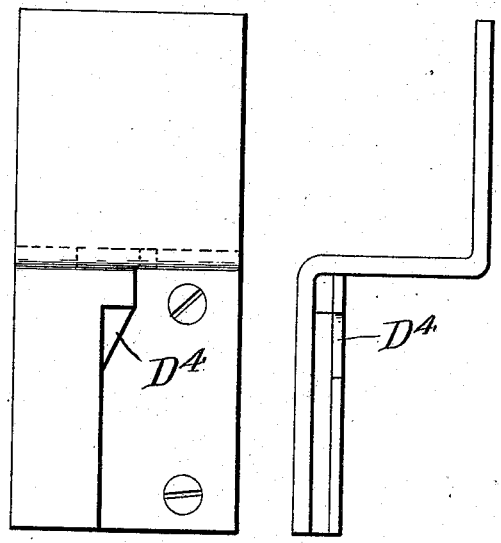
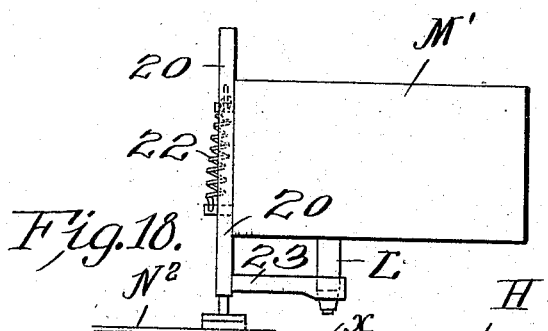

UNITED STATES PATENT OFFICE.

WILLIAM G. REYNOLDS, OF CHICAGO, ILLINOIS.

TYPE-MAKING MACHINE.

No. 923,998.        Specification of Letters Patent.        Patented June 8, 1909.

Application filed May 2, 1908. Serial No. 430,626.

*To all whom it may concern:*

Be it known that I, WILLIAM G. REYNOLDS, citizen of the United States, residing at Chicago, in the county of Cook and State of Illinois, have invented certain new and useful Improvements in Type-Making Machines, of which the following is a specification.

This invention is a machine for making embossed type, that is, type in which the face thereof is embossed or raised by means of a die press.

The present machine includes a die press into which the stock, in the form of a thin strip of metal, is fed, and the press cuts off pieces of proper size to make one type and embosses the type face thereon by means of a plunger and die.

The machine also includes formers which, after the type is embossed, bend the ends of the same around a mandrel to give the type the form of an incomplete ellipse.

The machine also includes means for feeding the stock and for delivering the complete type.

The machine is illustrated in the accompanying drawings in which—

Figure 1:
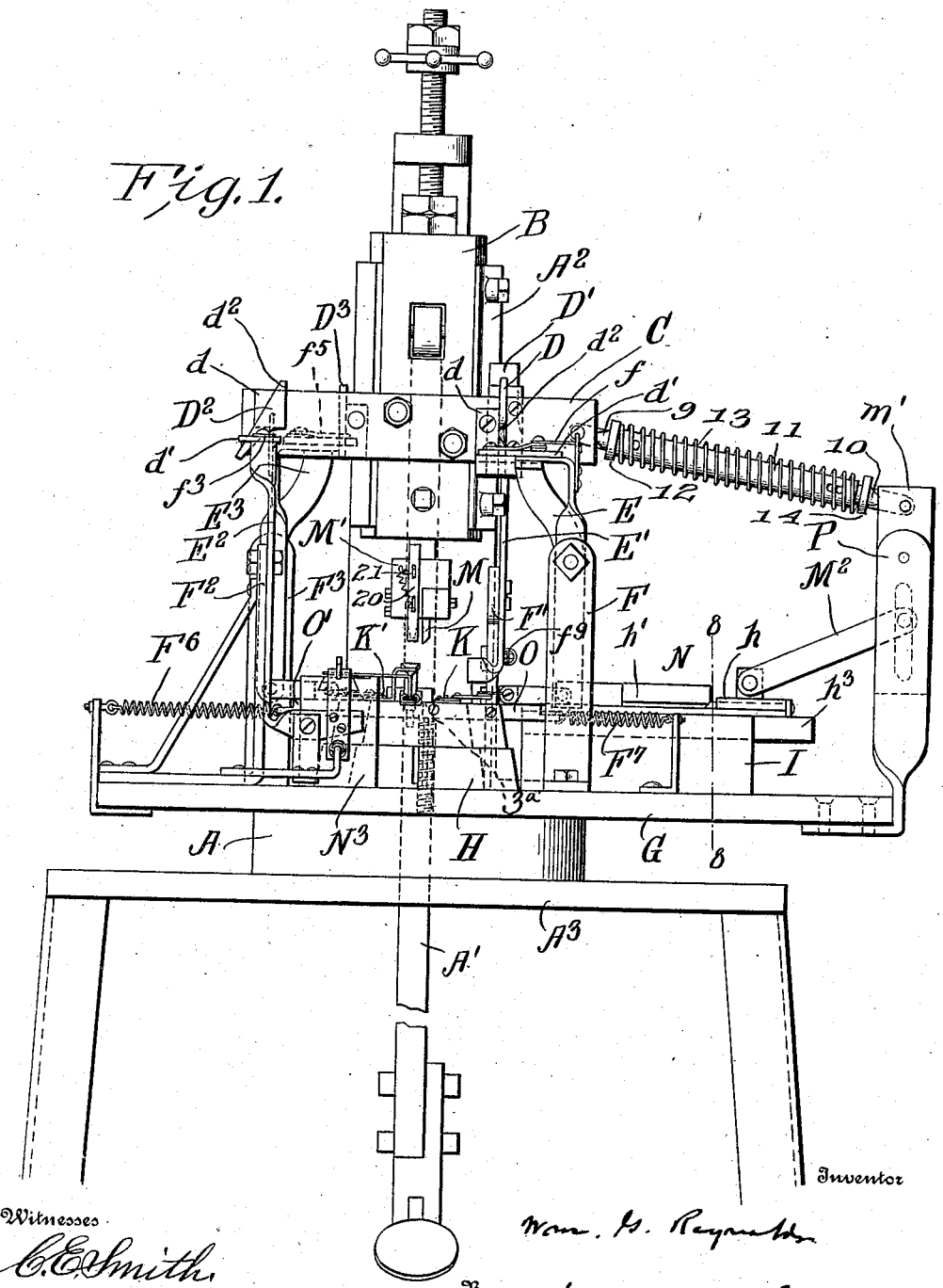
Figure 2:
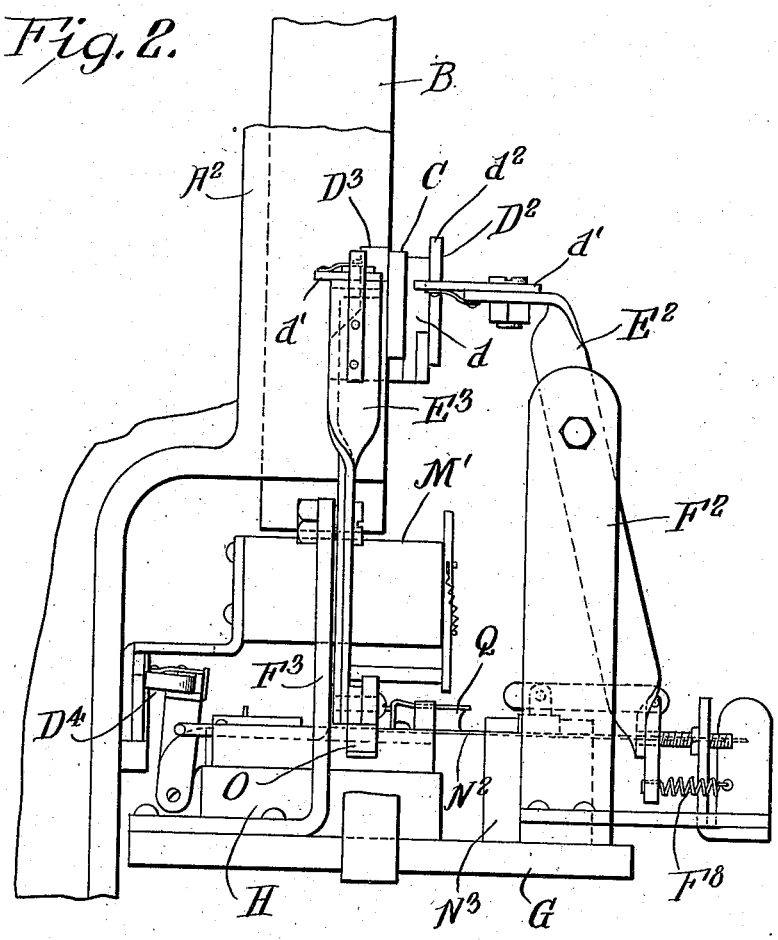

Figure 1 is a front elevation thereof; Figs. 2 and 3 are side elevations from opposite sides; Fig. 4 is a rear elevation; Fig. 5 is a top plan view of the embossing and forming devices, the plunger and associated parts of the press being removed; Fig. 6 is a cross section through the die cavity and the center of the base; Fig. 7 is a section at a right angle to Fig. 6; Fig. 8 is a vertical section of the feeding device, on the line 8—8 of Fig. 1; Fig. 9 shows details of the formers; Figs. 10 and 10$^a$ are details in side and top view of one of the levers actuated by cams to operate the formers; Figs. 11 and 11$^a$ are front and top views showing the cam devices attached to the press plunger; Figs. 12 and 12$^a$ are top and sectional views of part of the mechanism used to operate the type mandrel, showing the completed type thereon. Fig. 13 is a side view of the devices used to hold the stock while the feed is retreating for a new hold. Figs. 14, 15, 16, 17, 17$^a$ and 18 show details to be hereinafter described.

Referring specifically to the drawings, B indicates the slide or plunger of a die press which moves up and down in the guides A$^2$ mounted upon a frame A$^3$ and operated by a treadle attached to a rod A'; or it may be operated by any other suitable means.

C is a cross piece secured to the front of the plunger, and said cross piece carries four cams D, D', D$^2$ and D$^3$ (see Figs. 11 and 11$^a$) screwed respectively to the front and rear faces thereof near the outer end. These cams D, D', and D$^3$ actuate the upright levers E, E' and E$^3$ which actuate the formers, and these levers are pivoted on uprights or standards F, F' and F$^3$ which rest on a plate G bolted securely to the bed A of the press. The cam D$^2$ and lever E$^2$ operate the mandrel, as hereinafter described.

The base block H is secured to the plate G and serves as a support for the female die J and the sliding formers K and K', the operation of which will be hereinafter explained.

The male or punch die L, and a cutter M, are secured in the block M' at the lower end of the plunger B, these parts being fixed by set screws as usual.

The stock is fed by a feeding device indicated as a whole at N, and to be hereinafter described.

At the front side of the press is a mandrel N$^2$ around which the flanges of the C-shaped types R are formed after the characters of said types have been embossed and the types cut off the stock.

N$^3$ is a support and device for operating the mandrel N$^2$, the operation being effected by the cam D$^2$ on the front of the cross bar C, as hereinafter described.

The formers K and K' work laterally with respect to the die, at opposite sides thereof, and they are mounted respectively on sliding pieces O and O' which work in beveled grooves in the block H. Behind the die is another slide O$^2$ (see Figs. 5 and 6), operated by the cam D$^4$. This slide lies in alinement with the mandrel N$^2$ and on the opposite side of the die thereto. The slide has a beveled end adjacent the die, as shown in Fig. 6, and when it is moved forward it laps over the end of the mandrel N$^2$ and holds the same down while the flanges or ends of the type blank R are being formed around it by the formers K and K' which work toward and from the die.

The operation of the device will now be described in connnection with a description of the minor parts associated with the major parts above referred to. When the plunger B is pressed down it carries with it the cross bar C and the cams D', D$^2$ and D$^3$. As the plunger moves down the upper ends of the levers E, E', E$^2$ and E$^3$ swing horizontally into position above the cams, the levers being mounted on their standards in upright position, on horizontal pivots. When the plunger of the press has completed its downward stroke and embossed and cut off the character on the type piece at the end of the stock, and has traveled a short distance on its upward stroke, the levers E, E² and E³ begin to act. First, the lower end of lever E² swings inward toward the female die J, carrying with it the mandrel N² to a position directly above and lapping across (see Fig. 6) the embossed and cut off type which is lying face downward in the female die J. Immediately thereafter the sliding piece O² meets and overlaps the end of mandrel N², pressing the same down upon the type which is lying face downward in female die J, waiting for its flanges to be curved around mandrel N². Immediately after the pressing down of the mandrel N² by slide O² the forming parts K and K', which have been advancing, come in contact with the ends of the yet unformed flanges of the type. Formers K and K' are respectively composed of two relatively movable sections or parts, a lower part 40 which is movable in the line of travel, and an upper part 41 which is solid with the slide on which it is mounted. As the lower pieces which are movable on the slides on which they with the upper parts are mounted, come in contact with the type flanges, they, the sliding lower pieces, engage the ends of the type flanges and bend the same to a position nearly perpendicular, at the same time retreating against springs $f^4$, allowing the whole forming mechanism to still advance and the upper and solid parts thereof to complete the operation of curling the type flanges around mandrel N². The forming parts, with their slides and levers, are then immediately released and resume their first position. Immediately upon the completion of such forming operation the slide O² is released and resumes its first position, thus releasing mandrel N², which rises, carrying with it the completed type character and retreats to its first position. During the same upward stroke of slide B, the lever E' has been actuated by its cam D', its lower end being swung forward and so bearing down upon locking piece or jaw 2ª, (Fig. 13) which is in turn pressed down upon and holds the strip of stock while the feed mechanism is retreating to obtain a new hold upon the stock. Just before the slide B again starts downward to emboss and cut off another character, the jaw 2ª and its lever are released and returned to their first position by their spring, thus releasing the stock, which is again gripped and brought forward by the feed mechanism N.

The feed mechanism N is composed of the following parts: I is an oblong block inside of which is a groove running lengthwise of said block and narrower at top than bottom, forming a beveled bearing. $h^3$ is a beveled slide working in said groove and bearing on its surface a plate on which is pivoted a horizontal lever $h'$. Upon the same plate and just back of lever $h'$ is slide $h$, the end of which, in moving forward, comes under and lifts up the rear end of lever $h'$, causing the forward end of lever $h'$ to bear down upon and grip the strip of stock $x$ which lies underneath and parallel with said lever $h'$. The link M² which actuates slide $h^3$ and auxiliary slide $h$, is actuated by arms or levers $m$ and $m'$, pivoted on standard P, and in its further progress actuates the whole feeding mechanism after slide $h$ has become jammed under the rear end of lever $h'$. The lever $m$ is connected to cross piece C by a collapsible rod or lever for driving the feed mechanism and designed to prevent buckling of the stock. 9 and 10 are the respective parts of the rod. They are placed end to end and held in the same plane by a jacket of tubing 11. This jacket, with collar 12 is soldered and pinned solidly to rod 9. Coiled spring 13 surrounds both rods and the tubing, being compressed between collars 12 and 14 as rods. 9 and 10 are brought together endwise within the tubing jacket at the finish of the stroke of the press and of the feed.

The cams D, D', D², and D³, which are screwed onto cross bar C, are identical in principle, although of different proportions. Each cam consists of a block $d$ the upper end of which forms a shelf or shoulder $d^4$ which, in the upper movement of the cam, engages underneath the right angle pivoted end of the lever $d'$ at the upper end of each lever E, E', E² and E³. When thus engaged and moved the cam lifts the horizontal pivoted end of the lever $d'$ until the latter slips off from the top shelf or shoulder of the cam. The motion of the lever $d'$ then ceases, but its position is maintained by its horizontal end bearing against the perpendicular face of the cam as the latter continues to move upward. The perpendicular face of the cam has upon it a plate $d^2$ which partially covers such perpendicular face and cuts diagonally across the aforesaid face of the cam. (See D², Fig. 1.) As the cam passes upward and its perpendicular face bears against and rubs past the horizontal pivoted end of the lever, said pivoted end is swung gradually off by said diagonal plate $d^2$ finally slipping entirely off the perpendicular face of the cam, releasing the lever and allowing the horizontal end of the lever to lie along side of the cam. Then, as the cam moves downward again, the pivoted horizontal end of the lever is, by its spring, pulled over directly above the shelf or shoulder of the cam, in position to be again lifted and swung as the cam once more returns upward.

Q in Fig. 15 is a detail of a piece which bestrides mandrel N² and, by means of its downward curving prongs, holds the completed type back on mandrel N² as the latter again goes forward, so that another type may be formed or clasped around it. A rubber or metal stripper 3ᵃ, is placed about or contiguous to male die L, that the latter may not lift the cut and embossed but still unformed letter out of the female die J. Cam D⁴ is attached to the back of block D³, and in its downward and upward movements actuates lever E⁴ just as levers E, E', E² and E³ are actuated, and thereby moves slide O² in the manner described.

Mandrel N² has a flat thin strip attached which forms an extension of the lower face of the mandrel N². To the upper flat side of this extension strip is attached a bracket or hanger 4ᵃ the end of which is bent downward at right angles and fastened lengthwise along the center of said extension strip, thereby suspending both extension strip and mandrel N² which are fastened together. Said bracket or hanger 4ᵃ is attached to a beveled slide N⁴ which works in a beveled box bearing N³, which beveled slide is connected by a link to the lower end of lever E², so that the movement of lever E² gives said slide, bracket and mandrel N² their proper motion.

The stock strip is fed or passes through guides $g$. The levers E, E', E² and E³ are returned to original position, after operation by the cams, by means of springs F⁶, F⁷, F⁸ and F⁹. The levers or catches at the top of the levers just mentioned are returned by springs $f, f^2, f^3$ and $f^5$. The movable parts of the formers K and K' yield against springs $f^4$. The bracket P supports the levers for operating the feed, and the pivot is offset as shown in Fig. 3 to bring the levers into proper line. A spring $h^6$ releases the gripping lever $h'$ after the slide $h$ is retracted. Said slide has a rib $h^7$ extending through a slot $h^8$ on the block I, to which rib the link M² is connected.

The stripping device shown particularly in Fig. 18 consists of a piece 20 placed perpendicular on the front end of the head M' and movable up and down by means of slots 21, the springs 22 returning it to normal position. The downward stroke of the slide of the press brings the piece down upon center of mandrel N², depressing the same and at the same time causing said piece to move upward relative to head block M'. The piece 20 serves the further purpose of carrying a stripper 23 consisting of two thin strips of metal extending under the head block and toward rear of the press. The male die L, as the slide of the press comes down, comes between the strips and on upward or return stroke of the slide of the press and male die L, said male die L scrapes between the strips and the embossed and cut off type character is thereby pulled off from the male die L and left lying in the counter or female die.

I claim:

1. The combination with a die press having movable and stationary die members, of means to bend the blank after pressing, comprising a flexible mandrel movable into the space between the die members and over the blank after the movable die member is retracted therefrom, means to depress the mandrel to contact with the blank on the stationary die member, and formers movable from opposite sides toward and from the mandrel and shaped to bend the blank around the same.

2. The combination with a die press having movable and stationary die members, of means to bend the blank after the die action, comprising a flexible mandrel movable into the space between the blank and the movable die after the latter is retracted, a plate movable oppositely to the mandrel and against the end thereof when advanced and shaped to press said end upon the blank to hold the same against the stationary die, and formers movable from opposite sides against the blank while so held and constructed to bend the same around the mandrel.

3. The combination of a horizontal mandrel, means to hold a blank under one end thereof, formers movable toward and from the mandrel from opposite sides and constructed to bend a blank so held around the same, and means to deliver the blanks along the mandrel and collect the same thereon, after bending.

4. The combination of a horizontal mandrel, means to hold a blank under one end thereof, formers movable toward and from the mandrel from opposite sides thereof, and having an upper rigid part and a lower yielding part, the latter of which has a beveled edge to lift the end of the blank into the path of the former, whereby a blank is bent around the end of the mandrel, and means to deliver the blanks along the mandrel, after bending.

5. The combination with a die, of a mandrel comprising a strip movable in and out over the die block, a support for said strip comprising a sliding block having an overhanging arm secured edgewise and lengthwise along the top of the strip, means to reciprocate said support and mandrel, formers movable laterally over the die block on opposite sides to and from the end of the mandrel and shaped to bend a blank around the edges of the mandrel, and means to deliver the blanks along the mandrel toward the rear end thereof.

6. The combination with a die press having a die block and plunger, a mandrel and formers movable to and from the top of the die block from various sides thereof, cams carried by the plunger, levers actuated by the cams, and operative connections between the levers and the mandrel and formers, to shape a blank on the die block.

7. The combination with a die press having a die block and plunger, a mandrel and formers movable to and from the die on various sides thereof, to shape a blank in the die, cams carried by the plunger, levers connected to the mandrel and formers, and connections between the levers and cams constructed to operate only during the upward stroke of the plunger, to then advance the mandrel and formers.

8. The combination with a die press having a die block and plunger, a mandrel and formers movable to and from the die on various sides thereof, to shape a blank in the die, cams carried by the plunger, levers connected to the mandrel and formers, and connections between the levers and the cams including yielding devices carried by the levers and which engage the cams and which yield during the downward stroke of the plunger and operate during the upward stroke thereof.

9. The combination with a die press having a die block and plunger, a mandrel and formers slidable on the block to and from the die at various sides thereof, to shape a blank in the die, cams carried by the plunger, upright levers pivoted upon the block and connected at their lower ends to the mandrel and formers respectively, and spring catches pivoted on the upper ends of the levers and arranged to engage the cams, to operate the levers, on the upward stroke of the plunger, and to yield thereto on the downward stroke thereof.

10. A feeding device for a die press, comprising in combination a block along and upon which the stock is fed, a slide mounted upon the block, a lever pivoted upon the slide and extending horizontally along the same and offset to extend over the block to grip the stock thereon, a wedge-shaped piece movable on the slide under the rear end of the lever to operate the same, means to operate said piece and the slide, and means to hold the stock when the slide is retracted.

In testimony whereof I affix my signature, in presence of two witnesses.

WILLIAM G. REYNOLDS.

Witnesses:
 FLORENCE HENDERSON,
 H. G. BATCHELOR.